US008973865B2

(12) United States Patent
Schneider et al.

(10) Patent No.: US 8,973,865 B2
(45) Date of Patent: Mar. 10, 2015

(54) TRI-HULL DIRIGIBLE AIRSHIP

(75) Inventors: William C. Schneider, Houston, TX (US); Ozden O. Ochoa, College Station, TX (US)

(73) Assignee: Irel Solutions Group Ltd., Calgary, Alberta ( * ) Notice: Subject to any disclaimer, the term of this patent is extended or adjusted under 35 U.S.C. 154(b) by 407 days.

(21) Appl. No.: 13/204,451

(22) Filed: Aug. 5, 2011

(65) Prior Publication Data

US 2012/0037748 A1 Feb. 16, 2012

Related U.S. Application Data

(60) Provisional application No. 61/372,286, filed on Aug. 10, 2010.

(51) Int. Cl.
*B64B 1/08* (2006.01)
*B64B 1/58* (2006.01)
*B64C 37/02* (2006.01)
*B64B 1/14* (2006.01)

(52) U.S. Cl.
CPC . *B64B 1/08* (2013.01); *B64C 37/02* (2013.01); *B64B 1/14* (2013.01); *B64B 1/58* (2013.01)
USPC .................................. 244/30; 244/2; 244/128

(58) Field of Classification Search
USPC .................... 244/2, 24, 25, 30, 128
See application file for complete search history.

(56) References Cited

U.S. PATENT DOCUMENTS

| 1,033,186 | A | * | 7/1912 | Merckens | 244/25 |
|---|---|---|---|---|---|
| 1,045,337 | A | * | 11/1912 | Spilka | 244/30 |
| 1,340,053 | A | * | 5/1920 | Janda | 244/30 |
| 1,608,822 | A | * | 11/1926 | Silver | 244/25 |
| 1,668,720 | A | * | 5/1928 | Jelalian | 244/2 |
| 1,801,039 | A | * | 4/1931 | Florig et al. | 244/2 |
| D158,736 | S | * | 5/1950 | Frank | D12/323 |
| 3,180,590 | A | * | 4/1965 | Fitzpatrick | 244/30 |
| 3,856,238 | A | * | 12/1974 | Malvestuto, Jr. | 244/5 |
| 4,591,112 | A | | 5/1986 | Piasecki et al. | |
| 5,046,685 | A | * | 9/1991 | Bose | 244/23 C |
| 5,383,627 | A | * | 1/1995 | Bundo | 244/26 |
| 5,518,205 | A | * | 5/1996 | Wurst et al. | 244/58 |
| 6,792,872 | B1 | | 9/2004 | Valdespino | |
| 6,843,448 | B2 | * | 1/2005 | Parmley | 244/30 |
| 7,131,613 | B2 | * | 11/2006 | Kelly | 244/171.4 |
| 8,016,229 | B2 | * | 9/2011 | Greiner et al. | 244/100 A |
| 2001/0041486 | A1 | | 11/2001 | Sidwell | |
| 2002/0003190 | A1 | | 1/2002 | Sankrithi et al. | |
| 2004/0104304 | A1 | | 6/2004 | Parmley | |
| 2005/0116091 | A1 | * | 6/2005 | Kelly | 244/24 |
| 2007/0102565 | A1 | * | 5/2007 | Speer et al. | 244/2 |
| 2012/0037748 | A1 | * | 2/2012 | Schneider et al. | 244/2 |
| 2012/0234964 | A1 | * | 9/2012 | Heppe | 244/2 |

* cited by examiner

*Primary Examiner* — Joseph W Sanderson
(74) *Attorney, Agent, or Firm* — King & Spalding LLP

(57) ABSTRACT

An airship system having a flexible envelope and at least one bladder positioned therein is described. The bladder(s) provide an impervious barrier between the gas within the bladder(s) and the air exterior to the bladder(s). The envelope includes longitudinal and hoops straps weaved together in a criss-cross manner. The envelope also includes rings positioned thereon that include truss members for receiving struts for removably coupling the airship to another airship. A tri-hull delta dirigible system is also described, comprising three airships coupled together using struts and arranged in an equilateral triangle formation. The tri-hull delta dirigible system has a similar lift capacity (volume) as a conventional large mono-hull dirigible, while minimizing the detrimental bending in the center of the conventional mono-hull dirigible.

20 Claims, 6 Drawing Sheets

TRI-HULL DIRIGIBLE AIRSHIP

CROSS-REFERENCE TO RELATED APPLICATION

This application claims priority to U.S. Provisional Patent Application 61/372,286 filed on Aug. 10, 2010, entitled "Tri-Hull Airship", and is hereby fully incorporated by reference herein for all purposes.

TECHNICAL FIELD

The present invention relates generally to cargo airships. More particularly, the present invention is directed to a dirigible suitable for the long haul of heavy cargo.

BACKGROUND

Conventional airships, or dirigibles, are used in a variety of applications, including heavy cargo, surveillance, transportation, and observation. Conventional dirigibles typically include a single hull, or singlet, having an ellipsoid body, or envelope, and a frame. Generally, the efficiency of the dirigibles is dependent on the weight to volume ratio of the singlet. Conventional dirigibles are typically known to be efficient based on their weight to volume ratio, however, the body of singlet has been known to buckle upon lifting of heavy cargo. To eliminate the problem of buckling, additional framing can be added to the upper portion of the body for added strength. However, the additional framing results in the weight of the singlet to increase, thereby requiring an increase in the size of the singlet to maintain efficiency. As a result, conventional single-hull dirigibles having the additional framing and weight would result in the size of the singlet being unfeasibly too large, and could potentially buckle due to its size even with the additional framing. Dual-hull dirigibles also are not feasible options for heavy cargo lift, as they are incredibly unstable since the load would be positioned between the two hulls and any difference in size or weight between the two hulls could cause the dirigible to rotate or invert.

Therefore, a need exists for an improved dirigible that is stable and able to withstand long haul of heavy cargo without buckling.

SUMMARY

The present invention satisfies the above-referenced need by providing an airship having a bladder positioned therein. In one aspect of the invention, the airship includes an outer envelope having a nose end, a tail end opposing the nose end, and a cavity therein. At least two segments having a gas, such as helium gas, are positioned within the cavity of the outer envelope. The segments provide an impervious air barrier for containing the gas therein. The segments can include two or more bladders or a single bladder having multiple sections. In certain embodiments, the segments are constructed from biaxially-oriented polyethylene terephthalate multi-layer films.

In another aspect of the invention, the airship includes an outer envelope having a nose end, a tail end opposing the nose end, and a cavity therein. The outer envelope also includes longitudinal and hoop straps that are weaved together in a criss-cross manner. The airship can include multiple rings around the envelope, whereby the longitudinal straps are coupled to each ring by metal hoops. The longitudinal and hoop straps can be constructed from liquid crystalline polymer fibers. At least one bladder having a gas, such as helium gas, is positioned within the cavity of the outer envelope. The bladder(s) provide an impervious air barrier for containing the gas therein.

In yet another aspect of the invention, a dirigible of the present invention includes three airships coupled together forming a tri-hull delta configuration. The three airships are positioned parallel to each other along the length of each airship, and are arranged at the apex of an equilateral triangle when coupled together. The airships each include multiple rings that include truss members for coupling to struts, the struts being removably coupled to each airship. In certain embodiments, each ring includes a V-shaped truss member for receiving ends of two struts at a 60 degree angle, and two linear truss member for receiving struts removably therein. Accordingly, the airships can be removably coupled to each other.

BRIEF DESCRIPTION OF THE DRAWINGS

For a more complete understanding of the present invention and the advantages thereof, reference is now made to the following description, in conjunction with the accompanying drawings briefly described as follows.

Figure 1A:
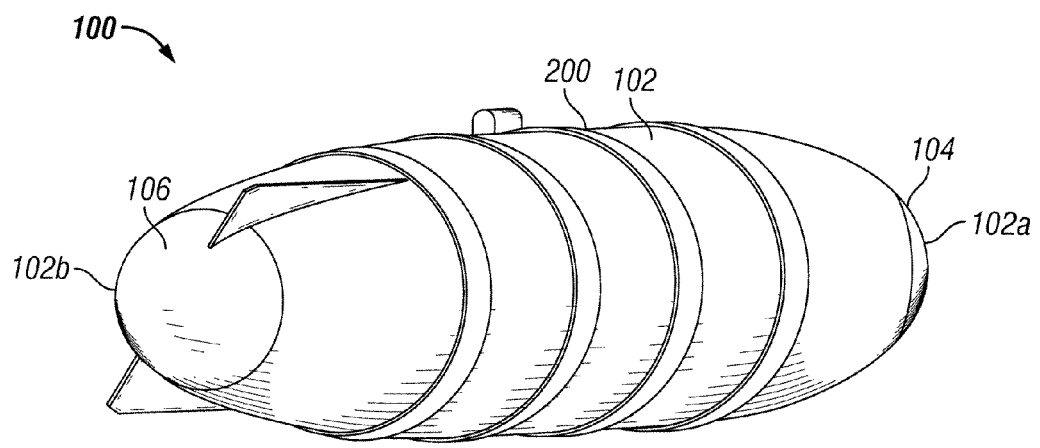
FIG. 1A is a perspective view of a single hull for a dirigible, according to an exemplary embodiment

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

The present invention is directed to a dirigible suitable for long haul of heavy cargo. Generally, the dirigible includes a singlet having multiple bladders positioned within, and can have an exterior formed of longitudinal and hoop straps intersecting, or criss-crossing, together. In certain exemplary embodiments, the dirigible includes three singlets coupled together using struts in an equilateral triangular formation. The invention may be better understood by reading the following description of non-limitative, exemplary embodiments with reference to the attached drawings wherein like parts of each of the figures are identified by the same reference characters.

Figure 1B:
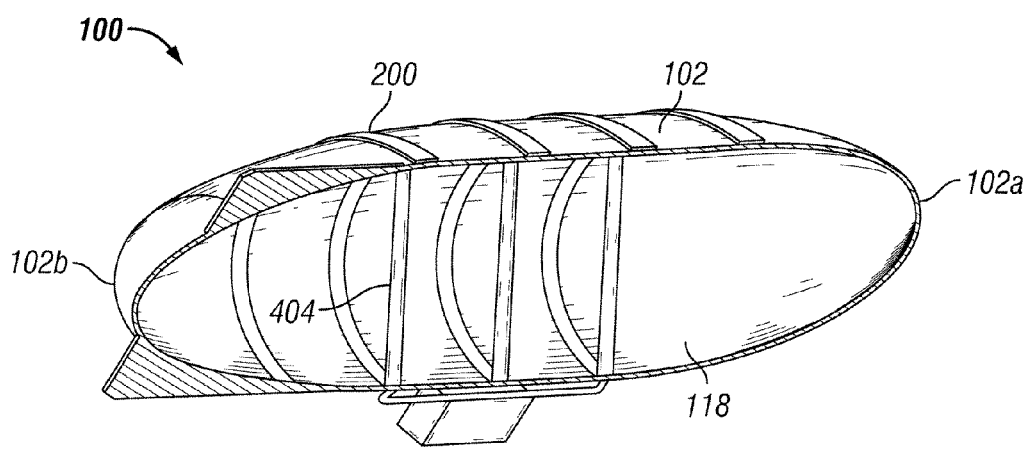
FIG. 1B is a side cross-sectional view of the single hull of FIG. 1A, with the bladders removed, according to an exemplary embodiment.
Figure 1C:
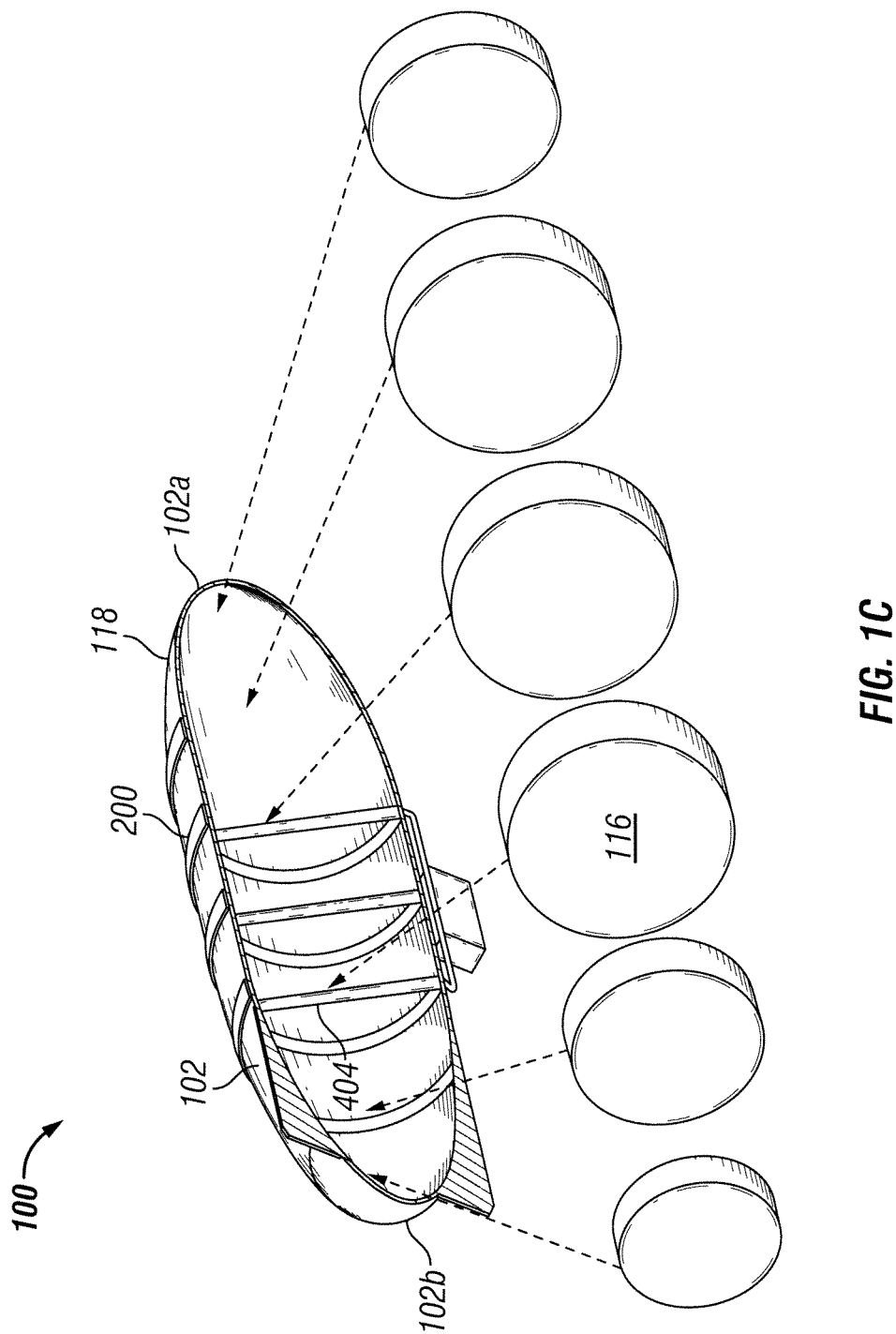
FIG. 1C is an exploded view of the single hull of FIG. 1A, according to an exemplary embodiment.

FIG. 1A is a perspective view of a singlet, or hull, 100 for a dirigible, FIG. 1B is a side cross-sectional view of the singlet 100 with bladders 116 removed, and FIG. 1C is an exploded view of the singlet 100, according to an exemplary embodiment. Referring to FIGS. 1A-1C, the singlet 100 includes a generally ellipsoid-shaped soft inflatable envelope or body 102 having a nose end 102a, a tail end 102b opposing the nose end 102a, and a length L extending from the nose end 102a to the tail end 102b. In certain exemplary embodiments, the tail end 102b of the ellipsoid is about 40 percent (%) longer than the front. A nose section 104 is coupled to the nose end 102a of the body 102, and a tail section 106 is coupled to the tail end 102b of the body 102. In certain exemplary embodiments, the nose section 104 and the tail section 106 are constructed from any rigid structural material, such as molded graphite. In certain alternative embodiments, the nose section 104 and the tail section 106 may be constructed from aluminum or titanium, or a composite having a carbon fiber reinforcement. In certain exemplary embodiments, the nose section 104 and tail section 106 provide a means for attaching to longitudinal straps of the body 102. The singlet 100 also includes rings 200 (FIGS. 2A-2B) circumferentially surrounding the body 102. In certain exemplary embodiments, the singlet 100 includes four rings 200 spaced apart along the length L of the body 102. In certain exemplary embodiments, each ring 200 is constructed from any rigid structural material, such as a honeycomb graphite epoxy. In certain alternative embodiments, the rings 200 may be constructed from aluminum or titanium, or a composite having a carbon fiber reinforcement. In certain exemplary embodiments, the rings 200 provide a means for attaching to longitudinal straps 302 of the body 102, as described further with respect to FIGS. 3A and 3B below. In certain embodiments, the rings 200 also provide a means for attaching struts 404 (FIGS. 4A-4B) for securing the singlet 100 to another singlet. In certain exemplary embodiments, the struts 114 extend from an interior cavity 118 of body 102 to the exterior.

Referring to FIGS. 1B and 1C, the singlet 100 includes a plurality of bladders 116 positioned within the interior cavity 118 of the body 102 to create separate sections within the body 102. Generally, each bladder 116 is filled with helium gas. In certain exemplary embodiments, the bladders 116 are constructed from a multi-layer impervious film, such as biaxially-oriented polyethylene terephthalate (boPET) multi-layer films. In certain embodiments, the bladders 116 are constructed from a reinforced Mylar®-based laminate, and offers gas permeability, strength and resistance to surface scratches. In certain exemplary embodiments, six flexible cylindrical bladders 116 are positioned within the interior cavity 118, and take the shape allowed by the straps that form the body 102. In certain alternative embodiments, a single bladder having a plurality of separate sections therein can be included. Generally, the bladders 116 form an impervious air barrier between the helium gas inside and the outside air. The bladders 116 divide the body 102 into separate volumes, and ensure that if there were to be a leak in one volume or section, the entire singlet 100 would not be subject to failure. In certain exemplary embodiments, the bladders 116 are configured to retain the helium gas, while the straps of the body 102 form the load-bearing component of the singlet 100 and take on the tensile load. In certain exemplary embodiments, the bladders 116 when placed together are sized to be about 10 percent (%) larger than the body 102. In certain exemplary embodiments, the longitudinal straps 302 and hoop straps 304 (FIGS. 3A-3B) form the load bearing component of the singlet 100 while the bladders 116 only retain gas on the interior, but takes no tensile load. In certain exemplary embodiments, the singlet 100 is about 552 feet (ft) long with a largest external body diameter of about 110 ft, and a total weight of about 50 tons. In certain exemplary embodiments, the singlet 100 is designed to carry a 60 ton cargo.

Figure 2B:
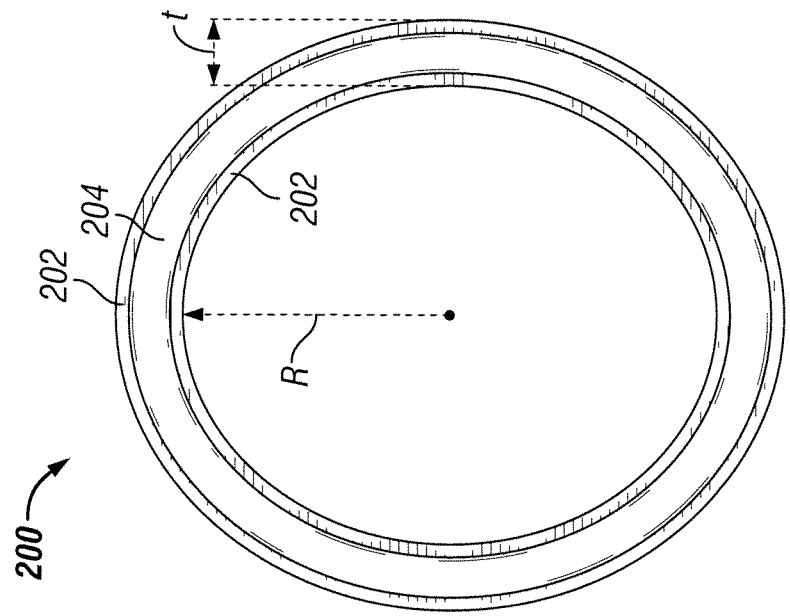
FIG. 2B is a side cross-sectional view of the ring of FIG. 2A, according to an exemplary embodiment.
Figure 2A:
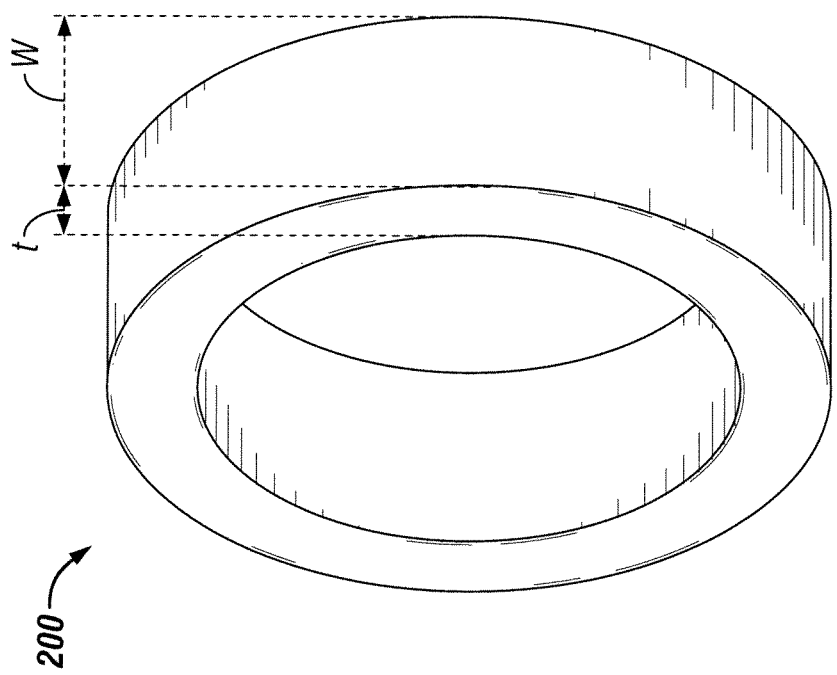
FIG. 2A is a perspective view of a ring for surrounding the body of a single hull, according to an exemplary embodiment.

FIG. 2A is a perspective view of the ring 200 surrounding the body 102 of the singlet 100, and FIG. 2B is a side cross-sectional view of the ring 200, according to an exemplary embodiment. Referring to FIGS. 2A and 2B, the rings 200 provide a conformal shape to the soft skin of the body 102 (FIGS. 1A-1C) and the modular bladder 116 (FIGS. 1A, 1C) construction. In certain exemplary embodiments, the three rings 200 proximate to the nose end 102a have a constant diameter reflecting the tailored cylindrical region both for load distribution and ease of manufacturing. The rings 200 also can serve as reinforcement sites to attach an engine (not shown) as well as provide passage and support for iso-truss members. In certain exemplary embodiments, the ring 200 includes a carbon fiber reinforced epoxy resin system 202 having a nonmetallic honeycomb Nomex® core 204. The system 202 can be constructed from a cured graphite epoxy laminate. In certain exemplary embodiments, the core 204 can be constructed from Hexcel's HexWeb HRH-10 having a density of about 4 pounds per cubic feet (lb/ft3), and having a core thickness of about 4 inches (in). In certain embodiments, the ratio of a radius R to a thickness t of the ring 200 is about 165. In certain embodiments, the ring 200 can be fabricated by joining flat panels together. In certain exemplary embodiments, the ring 200 includes panels having a width w of about 2 ft, which circumscribe the ring 200 having a radius R of about 55 ft.

In certain exemplary embodiments, methods of fabricating the ring 200 include curing the system 202 separately either in autoclave or out-of-autoclave through vacuum assisted resin transfer molding (VARTM). The system 202 can then be bonded to the Nomex® core on a frame scaffold (circular arc mandrel) to create the ring shape. This system is clamped until cured at room temperature and then removed. The number of panels to be joined together can depend on length of each panel. For instance, if the length of each panel is about 8 ft, then about 43 panel segments are needed to be joined together with adhesively bonded doublers per ring 200.

Figure 3A:
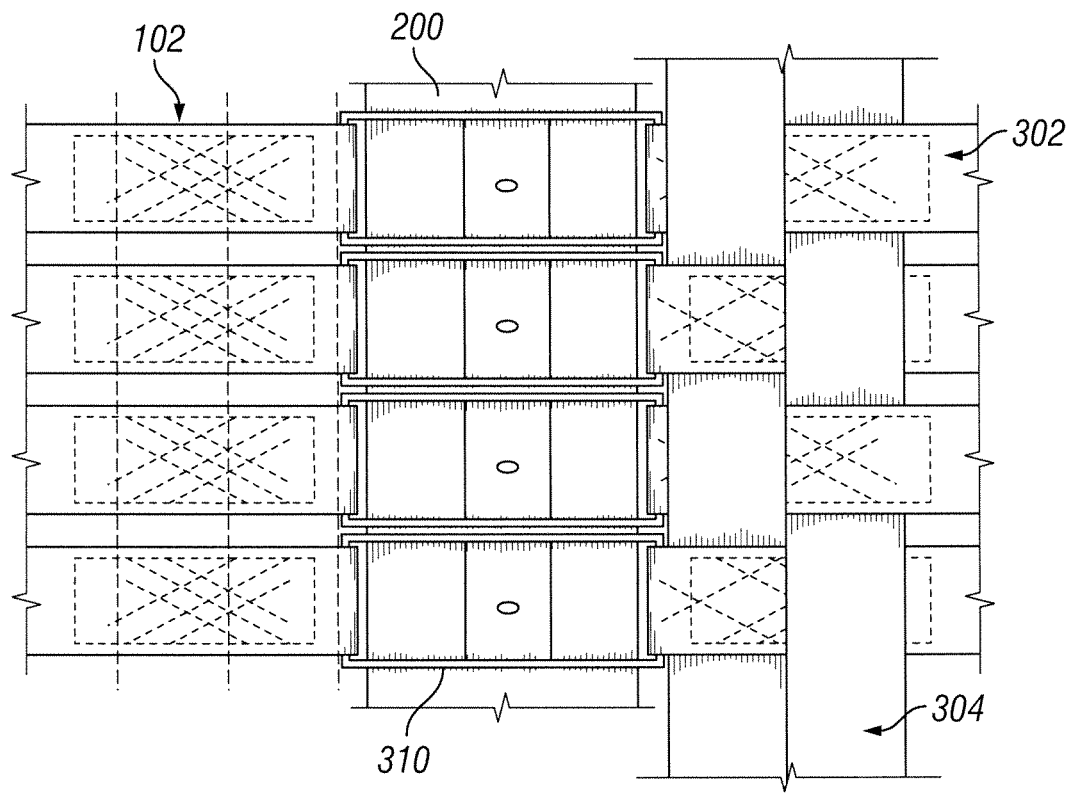
FIG. 3A is a partial front view of a body of a single hull coupled to a ring, according to an exemplary embodiment.
Figure 3B:
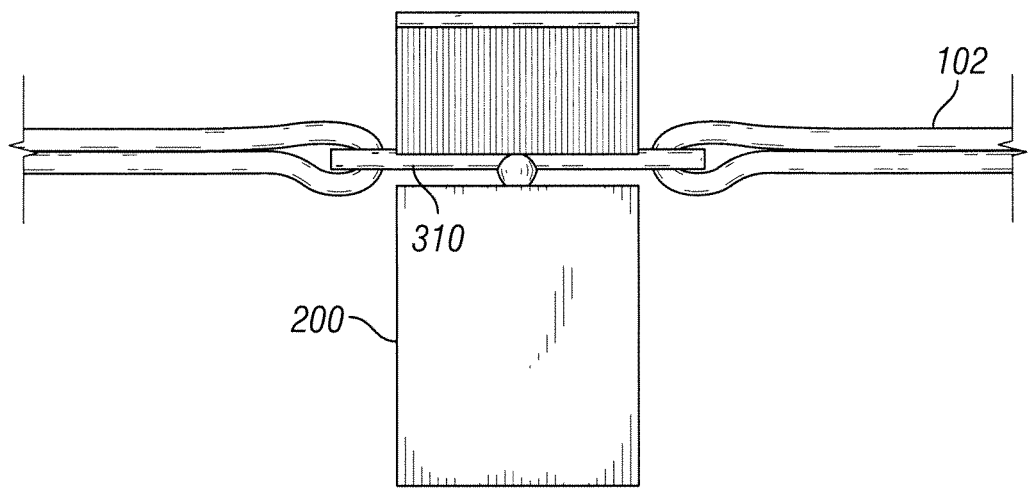
FIG. 3B is a partial side view of the body coupled to the ring of FIG. 3A, according to an exemplary embodiment.

FIG. 3A is a partial front view of the body 102 (FIGS. 1A-1C) coupled to the ring 200 (FIGS. 2A-2B), and FIG. 3B is a partial side view of the body 102 coupled to the ring 200, according to an exemplary embodiment. The body 102 includes a series of longitudinal straps 302 and hoop straps 304 arranged in a criss-cross or weave pattern. In certain embodiments, metal loops 310 are attached to the ring 200, and the longitudinal straps are inserted into the metal loops 310 to ultimately couple the longitudinal straps 302 to the ring 200. In certain exemplary embodiments, the straps 302, 304 are constructed from a high-strength, durable woven material. Suitable examples of high-strength, durable woven materials include a liquid crystalline polymer fiber with high creep, ultraviolet (UV) and moisture resistance, such as Vectran®. In certain exemplary embodiments, the strength of the hoop straps 304 varies by the location along the length L of the body 102. In certain exemplary embodiments, the strength of a hoop strap 304 at a center of the body 102 is greater than the strength of a hoop strap 304 at an end of the body 102.

Figure 4A:
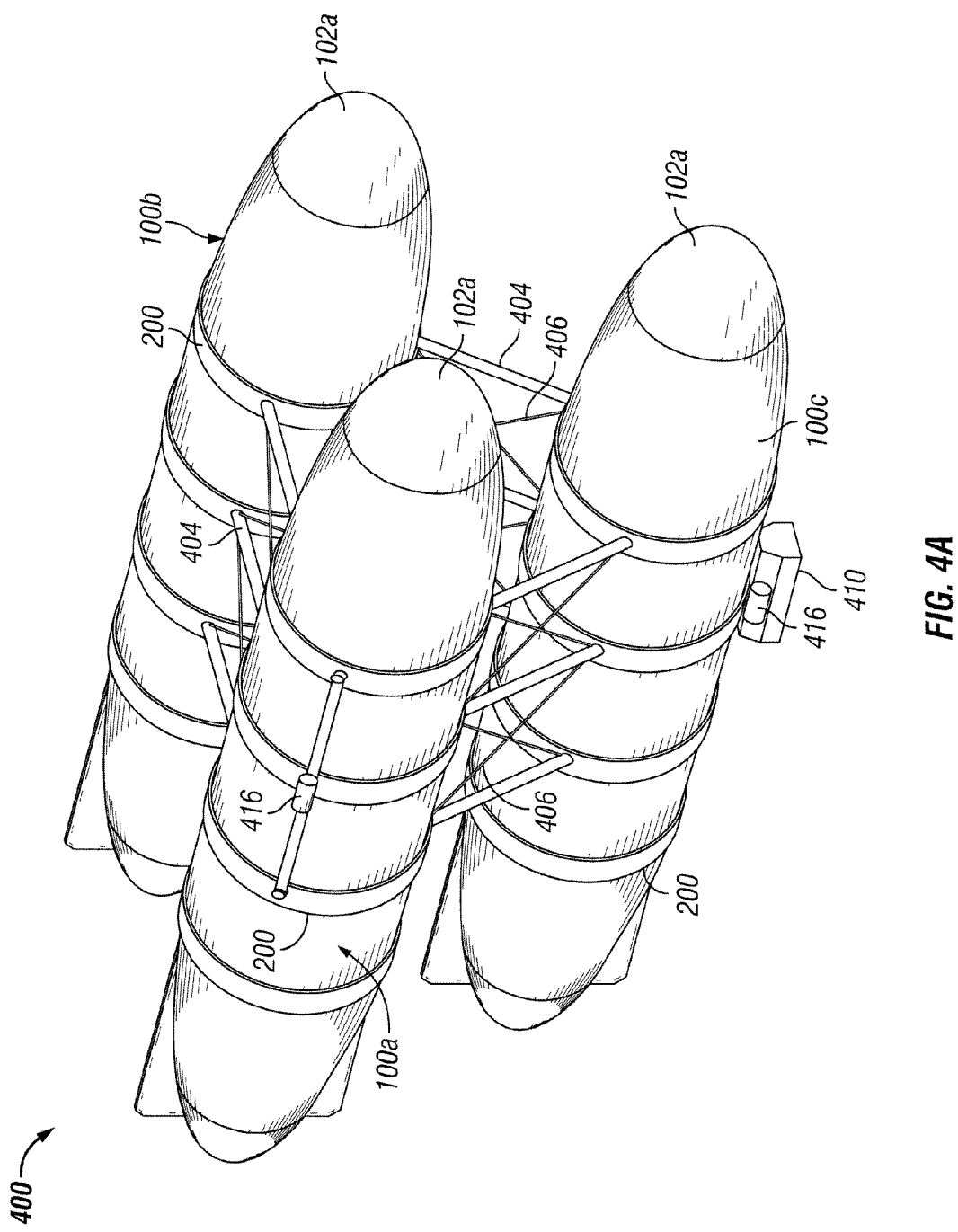
FIG. 4A is a perspective view of a tri-hull dirigible, according to an exemplary embodiment.
Figure 4B:
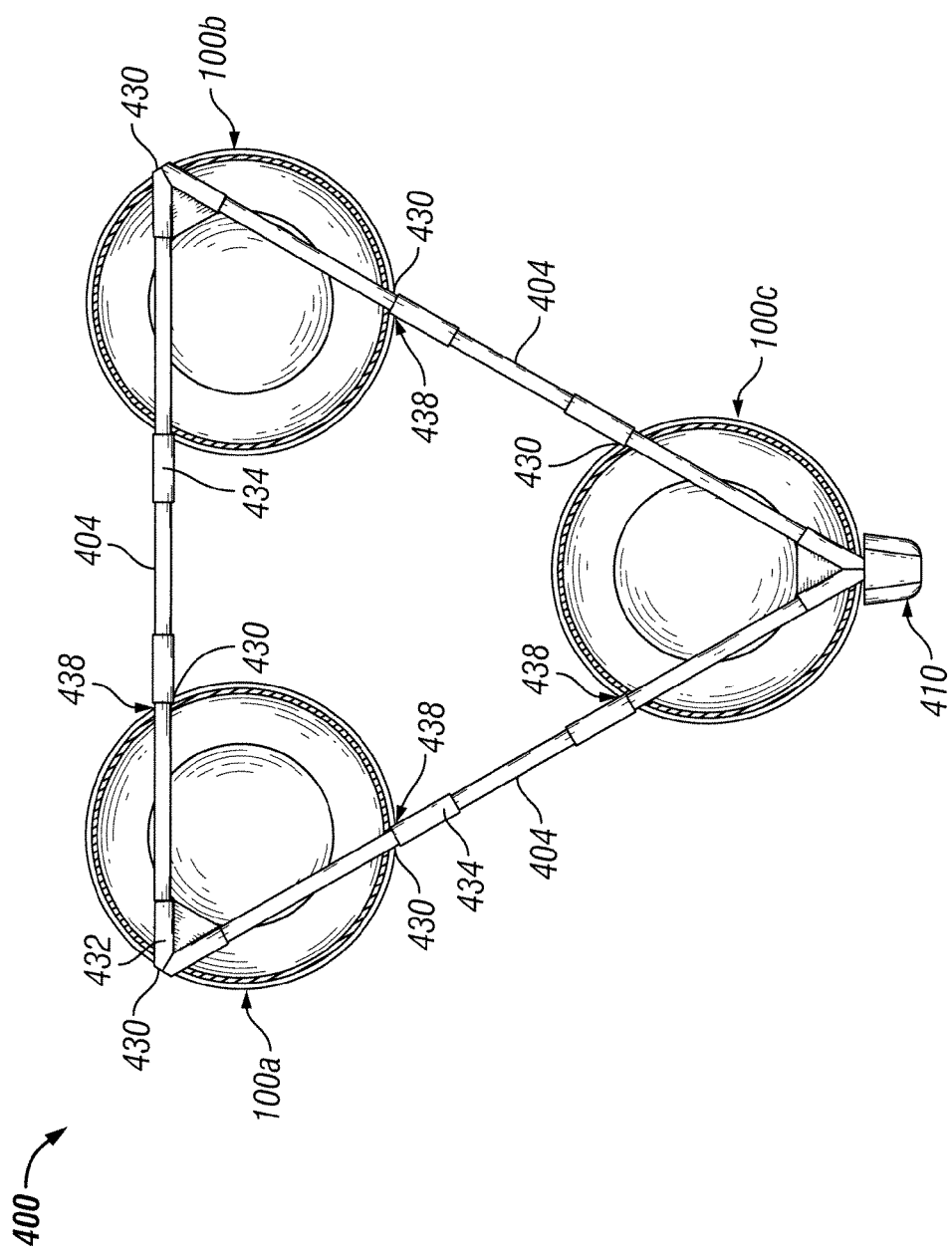
FIG. 4B is a side cross-sectional view of the tri-hull dirigible of FIG. 4A, according to an exemplary embodiment.

FIG. 4A is a perspective view of a tri-hull delta dirigible 400, and FIG. 4B is a side cross-sectional view of the tri-hull dirigible 400, according to an exemplary embodiment. Referring to FIGS. 4A and 4B, the tri-hull dirigible 400 includes three ellipsoid singlets 100a, 100b, 100c, collectively referred to herein as singlets 100 (FIGS. 1A-1C), coupled together using struts 404. The singlets 100 are positioned such that they are parallel to each other along its length, and are arranged at the apex of an equilateral triangle when coupled together. In certain exemplary embodiments, each singlet 100 is coupled to its adjacent hull using three struts 404 and a plurality of cross-tie cables 406 between the struts 404. The cross-tie cables 406 are attached between the struts 404 to serve as a shear-tie between the struts 404 to prevent fore and aft relative motion of the three singlets 100. The triangular design of the dirigible 400 allows for a much more stable configuration when compared to a dual-hull design. The dirigible 400 can also include a gondola 410, or control car, coupled to the bottom singlet 100c. The gondola 410 generally houses the pilot, crew, and passengers (not shown) of the dirigible 400. Four propulsion systems 416 are also included. Each of the top two singlets 100a, 100b includes a propulsion system 416, and the other two propulsion systems 416 are coupled to the bottom singlet 100c on either side of the gondola 410. The propulsion systems 416 and the gondola 410 are each attached with their own fixtures through the three rings 200 proximate the nose end 102a and the struts 404. Generally, the tri-hull dirigible 400 configuration reduces the overall dimensions of a single hull dirigible of the same volume and lift capacity. The three shorter singlets 100 attached through struts 404 also offer better performance and flexibility to tailor hauling range and cargo capacity when compared to conventional dirigibles.

Referring to FIG. 4B, the diagonal struts 404 generally experience compression while the horizontal struts 404 undergo tensile loads. In certain exemplary embodiments, each of the struts 404 has an external radius of about eight inches and a length of about 285 feet, thus resulting in an aspect ratio (length/diameter) of about 213. For the buckling driven diagonal struts 404, the ratio of the radius to wall thickness is about 16, while the radius to wall thickness for the horizontal struts 404 that are tensile load critical is about 53, reflecting the high tensile strength capacity of carbon-reinforced polymers. In certain exemplary embodiments, each of the rings 200 includes three metal reinforced holes 430 along its circumference for one V-shaped truss member 432 and two linear truss members 434 to pass through. In each of the V-shaped truss members 432, two struts 404 are coupled thereto at approximately 60 degrees relative to each other. In certain exemplary embodiments, the struts 404 are separable and are joined together to the truss members 434 at joints 438 using a bolted connection or other specially designed fitting, and can be disconnected at the joints 438 to separate the singlets 100 from each other. Accordingly, the tri-hull dirigible 400 can readily be separated into a dual-hull or a single-hull, or singlet 100, to accommodate smaller cargo loads.

Therefore, the invention is well adapted to attain the ends and advantages mentioned as well as those that are inherent therein. The particular embodiment disclosed above is illustrative only, as the invention may be modified and practiced in different but equivalent manners apparent to those having ordinary skill in the art and having the benefit of the teachings herein. While numerous changes may be made by those having ordinary skill in the art, such changes are encompassed within the spirit of this invention defined in the claims. It is therefore evident that the particular illustrative embodiments disclosed herein may be altered or modified and all such variations are considered within the scope and spirit of the claimed invention.

What is claimed is:

1. A tri-hull delta dirigible comprising:
 a first airship;
 a second airship; and
 a third airship,
 wherein each of the first, second, and third airships comprises
  an outer envelope having a nose end, a tail end opposing the nose end, a length extending from the nose end to the tail end, an exterior surface, and an interior surface defining a cavity therein;
  a first and second ring connected to said envelope, said first and second ring including an exterior surface, an interior surface, and reinforced holes extending therethrough; and
  at least one bladder positioned within the cavity of the envelope, the at least one bladder dividing the cavity into a plurality of separate volumes and providing a fluid seal between the plurality of separate volumes,
 wherein the first, second, and third airships are positioned parallel to each other along the length of each airship, and
 wherein each of the first, second, and third airships are coupled to the remaining airships in a spaced apart relation using a plurality of removable struts, wherein the first, second, and third airships are arranged respectively at each apex of a triangle when coupled together, a first apex positioned elevationally below a second apex and a third apex, the second apex and the third apex positioned within a horizontal plane above the first apex, wherein said plurality of removable struts are sized to allow a substantially open area between airships, and wherein each of said plurality of removable struts extends through the cavities of at least two airships and engages two of said reinforced holes in each of the at least two airships.

2. The dirigible of claim 1, wherein the at least one ring is orthogonal to the length of the envelope.

3. The dirigible of claim 2, wherein said first and second rings include a V-shaped truss member for receiving ends of two removable struts at a 60 degree angle.

4. The dirigible of claim 2, wherein said first and second rings include two linear truss members for receiving removable struts therein.

5. The dirigible of claim 4, wherein each of the airships are removable from the dirigible upon disconnection of the struts from the linear truss members.

6. The dirigible of claim 1, wherein the at least one bladder is sized ten percent larger than the outer envelope.

7. The dirigible of claim 1, wherein each of the outer envelopes of the first airship, the second airship, and the third airship comprises a plurality of longitudinal straps and a plurality of hoop straps coupled together in a criss-cross manner.

8. The dirigible of claim 7, wherein the plurality of longitudinal straps and the plurality of hoop straps form a load bearing component of each of the airships.

9. The dirigible of claim 1, wherein the at least one bladder comprises a plurality of separate sections.

10. The dirigible of claim 1, wherein the at least one bladder forms an impervious air barrier between a fluid filled within the at least one bladder and the atmosphere surrounding the at least one air bladder.

11. The dirigible of claim 1, wherein the fluid comprises helium gas.

12. A tri-hull dirigible comprising,
 a first truss member;
 a second truss member;
 a third truss member; wherein said first second and third truss members are configured in a triangular shape, and wherein said first truss member is generally horizontal;

a first airship;
a second airship; and
a third airship, wherein each of said airships includes a structural ring and an exterior skin that encloses a cavity therein, and wherein said first truss member passes through the cavities of said first and second airship and engages both of said structural rings of said first and second airships in two places, said second truss member passes through the cavities of said first and third airship and engages said structural ring of said first and third airship, and said third truss member passes through the cavities of said second and third airship and engages said structural ring of said second and third airship.

13. The tri-hull dirigible of claim 12, wherein said first, second, and third truss members are removable.

14. The tri-hull dirigible of claim 13, wherein said first, second, and third truss members have an aspect ratio of about 213.

15. The tri-hull dirigible of claim 13, wherein said first second and third truss members are circular with diameters of about eight inches.

16. The tri-hull dirigible of claim 13, wherein said second and third truss members are configured to have a higher resistance to buckling than said first truss member.

17. The tri-hull dirigible of claim 16, wherein said first, second, and third truss members are circular and wherein the ratio of the radius to wall thickness for said second and third truss members is higher than the ratio of the radius to wall thickness for said first truss member.

18. The tri-hull dirigible of claim 13, wherein said truss member are removable and said airships are configurable to be operated independently of each other.

19. The tri-hull dirigible of claim 13, wherein said first, second, and third truss members are joined together by V-shaped truss members.

20. The tri-hull dirigible of claim 12, wherein said structural ring includes a reinforced hole therethrough and wherein said truss members engage said structural ring through said reinforced hole.

* * * * *